United States Patent [19]

Gutschmidt

[11] Patent Number: 4,591,181
[45] Date of Patent: May 27, 1986

[54] HINGE-WING DRAWBAR MECHANISM

[75] Inventor: Paul C. Gutschmidt, Devils Lake, N. Dak.

[73] Assignee: Summers Mfg. Company, Inc., Maddock, N. Dak.

[21] Appl. No.: 771,155

[22] Filed: Aug. 30, 1985

Related U.S. Application Data

[63] Continuation of Ser. No. 496,354, May 19, 1983, abandoned.

[51] Int. Cl.⁴ ............................................. A01B 59/042
[52] U.S. Cl. .................................. 280/476 R; 172/310; 172/776
[58] Field of Search ............... 172/310, 311, 624, 626, 172/631, 657, 776; 280/411 R, 411 A, 412, 413, 476 R, 476 A, 491 C, 492, 493

[56] References Cited

U.S. PATENT DOCUMENTS 3,460,631  8/1969  Friesen et al. ................. 280/411 A
3,620,550 11/1971  Hornung ......................... 172/311 X
3,628,613 12/1971  Kaufman .......................... 172/311
3,654,999  4/1972  Fischer ............................ 172/311

FOREIGN PATENT DOCUMENTS 245015 11/1962  Australia ............................ 172/310

Primary Examiner—Richard T. Stouffer
Attorney, Agent, or Firm—Cushman, Darby & Cushman

[57] ABSTRACT

A hinge-wing drawbar device is disclosed wherein an internal and an external wing drawbar are secured to one another such that vertical movement of the external drawbar is permitted with respect to the internal drawbar. A support wheel is positioned between the internal and external drawbars with the axis of the support wheel being aligned with the axis of the end support wheel of the external wing drawbar.

7 Claims, 6 Drawing Figures

U.S. Patent  May 27, 1986  Sheet 1 of 2  4,591,181
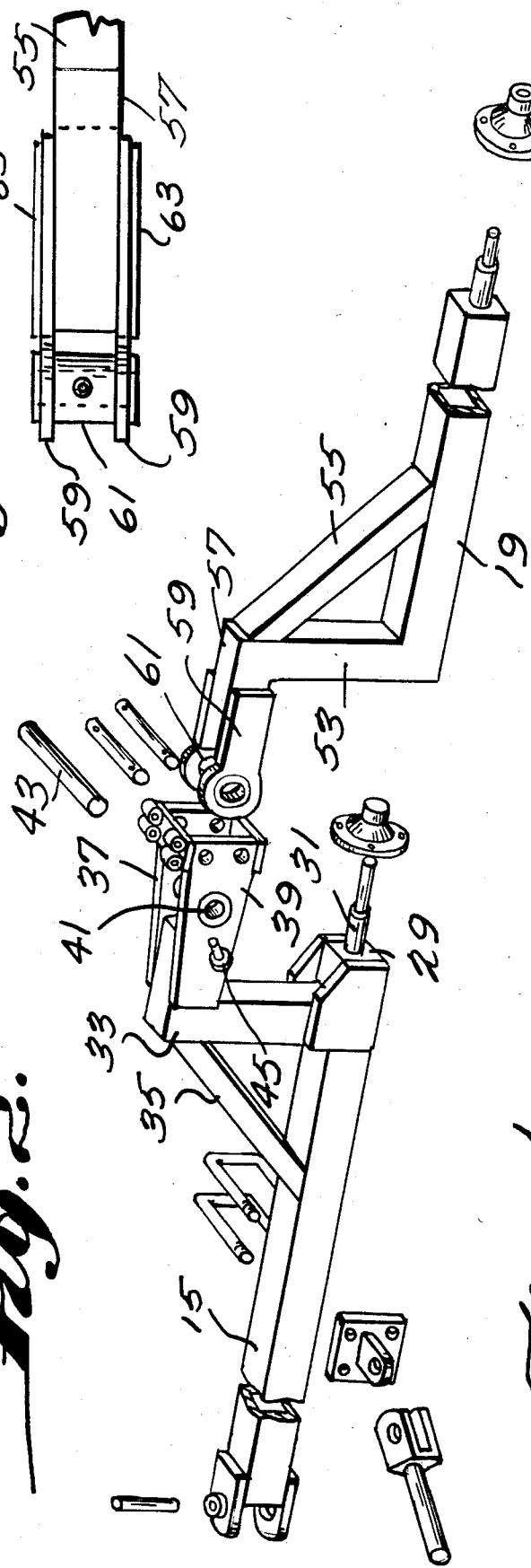

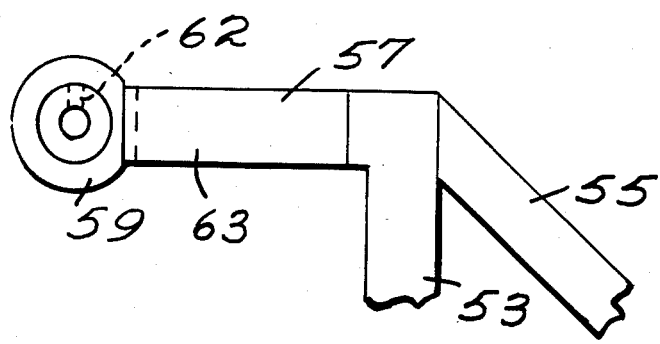
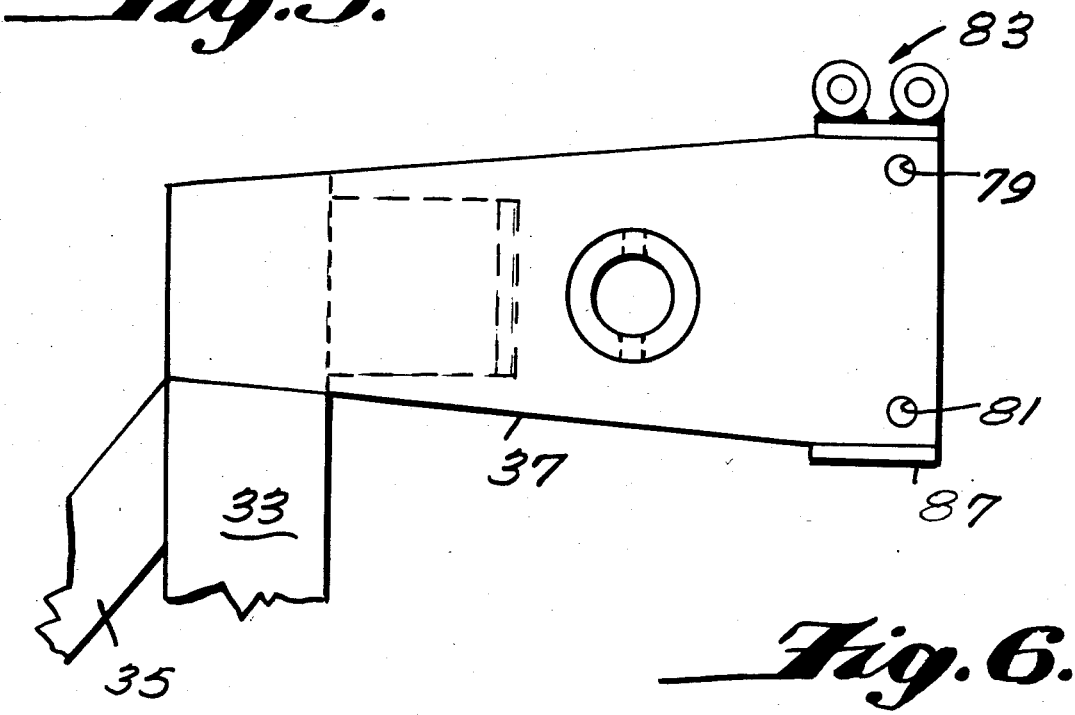
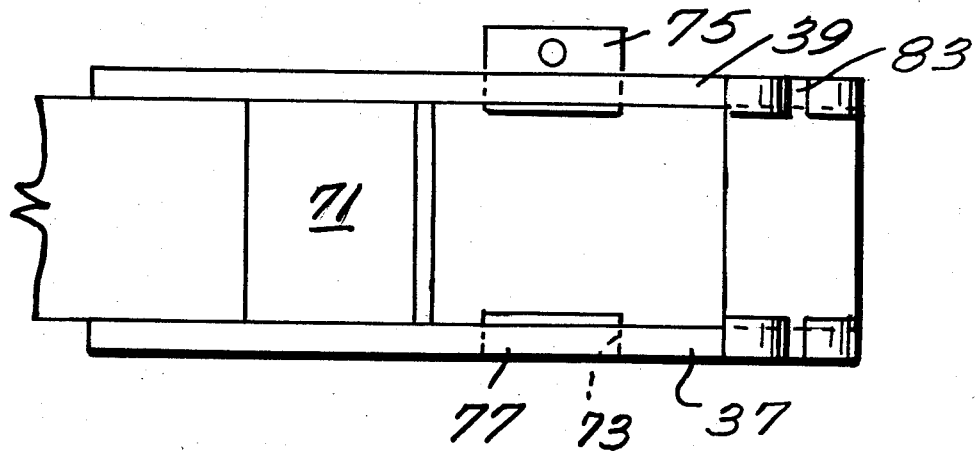

HINGE-WING DRAWBAR MECHANISM

This is a continuation of application Ser. No. 496,354, filed May 19, 1983, which was abandoned upon the filing hereof.

BACKGROUND OF THE INVENTION

This invention relates to a hinge-wing drawbar mechanism.

In the agricultural industry, as the size of farms has increased and the concomitant need for more efficient farming techniques has developed, farm implements have increased in size. For example, the size of harrows has grown in recent years to such an extent that now the outer sections of the harrows are hinged to the central sections thereof so that the outer sections can be folded for transportion from place to place. For example, a 112 foot harrow has a center section which is only 14 feet. The center section is limited to 14 feet because this is the maximum transport width for harrows. This means that each external wing section of the harrow would be 49 feet wide. Such long sections have presented problems. For example, farmers have found that a solid wing section of 28 feet is too long, let alone one that is 49 feet, when harrowing a field that has some degree of grade.

For this reason, harrows have been developed by the assignee of the present invention with a hinge point on each wing section of the harrow drawbars so that the outer hinged portions of the harrow can tilt vertically with respect to the inner portion of the harrow drawbar. In this structure a support wheel is positioned behind the drawbar for providing support proximate the hinged section of the drawbar. With this design a number of harrow teeth had to be sacrificed in order to provide clearance for the wheel in this the region of the hinged junction of the drawbars. Also, because of the wheel, the drawbar could not be rotated on the move to dump "trash" because the hinge point would rotate and dig into the dirt. It accordingly has become apparent that an improved hinge-wing drawbar assembly is necessary in order to provide a more efficient and improved harrow. Moreover, such an improved drawbar assembly can be used for other agricultural applications such as pulling sprayers, packers and other implements.

It accordingly is an object of this invention to provide an improved hinge-wing drawbar assembly for agricultural implements.

SHORT STATEMENT OF THE INVENTION

Accordingly, this invention relates to a hinge-wing drawbar device having a central drawbar with a pair of internal hinge-wing drawbars connected at the longitudinal ends of the central drawbar. An external hinge-wing drawbar is connected at each end of the internal hinge-wing drawbar. The external wing drawbars are aligned with the central and internal wing drawbars for the purpose of drawing a farm implement mechanism. A support wheel is rotatably connected to the respective ends of the internal wing drawbars with their respective axis of rotation aligned with each other and in parallel with the longitudinal axis of the internal and external wing drawbars. The external wing drawbar is flexibly connected to the central drawbar so that the external wing section of the drawbar can tilt or rotate in a vertical plane through the drawbar as the drawbar is being pulled while in operation.

The flexible connecting arrangement includes a first arm which is secured to the outer end of the internal drawbar and which extends upwardly above the support wheel mounted at the end of the internal drawbar. This arm has a pin receiving opening with the central axis thereof aligned in the direction of movement of the drawbar. A second arm is secured to the inner end of the external wing drawbar and also extends above the support wheel. The second arm has a pin receiving bearing which is aligned with the opening in the first arm. A pin is positioned through the opening and the bearing for rotatably connecting the external wing drawbar to the internal wing drawbar.

BRIEF DESCRIPTION OF THE DRAWINGS

Other objects, features and advantages of the present invention will become more fully apparent from the following description of the preferred embodiment, the appended claims and the accompanying drawings in which:

FIG. 1 is a partial plan view of the drawbar mechanism of the preferred embodiment of the present invention;

FIG. 2 is a partial perspective view of the drawbar assembly of the preferred embodiment of the present invention showing the flexible connection for the winged drawbars;

FIG. 3 is a partial plan view of the external wing flexible connector assembly of the preferred embodiment of the present invention;

FIG. 4 is a partial side elevation view of the external wing connector assembly of the preferred embodiment of the present invention;

FIG. 5 is a partial side elevation view of the internal wing connector assembly of the preferred embodiment of the present invention; and FIG. 6 is partial plan view of the internal wing connector assembly of the preferred embodiment of the present invention.

DETAILED DESCRIPTION OF THE PREFERRED EMBODIMENT

Turning now to FIG. 1, there is illustrated a partial plan view of the drawbar of the present invention. Only one half of the drawbar mechanism is illustrated in order to simplify the description of the preferred embodiment. The portion not illustrated is a mirror image of the illustrated portion. A center tube or beam 11 of the drawbar mechanism is shown rotatably connected to a hitch section 13 for the drawbar. The center tube of the drawbar 11 is rotatable about an axis parallel to its longitudinal direction. A tube 15 which forms the internal wing of the drawbar assembly is rotatably connected to the center tube 11 and to the hitch section 13. The internal wing is rotated as illustrated by the arrows for the purpose of transporting the drawbar from place to place. The internal wing drawbar 15 is connected to the hitch 13 by means of a rod or cable 17. The actual connection of the rod or cable 17 to the hitch 13 is not illustrated in order to simplify the drawing. An external wing drawbar 19 is connected to the internal wing drawbar 15 by means of a flexible connecting assembly generally designated by the numeral 21. The external wing drawbar 19 is pulled or drawn by a rod or cable 23 which is connected at the other end to the hitch 13 (not illustrated). The outer end of the external wing drawbar 19 is supported by a wheel 25. A second wheel 27 is connected to the outer end of the internal wing drawbar 15 and provides support for both the internal wing drawbar 15 and the external wing drawbar 19. The axis of the second wheel 27 aligns exactly with the axis of the outer wheel 25 of the external wing drawbar. The connector assembly 21, which will be disclosed in greater detail below, permits movement of the external wing drawbar 19 in a vertical direction as the drawbar is pulled over terrain having a variable grade. Any type of farm implement can be connected to the drawbar assembly illustrated in FIG. 1 such as a harrow, a sprayer, a packer or other farm implement.

Turn now to FIG. 2 which is a perspective view of the connector assembly for the drawbar of the present invention. With reference to FIG. 2, the internal wing drawbar 15 is illustrated broken away and with its outer end 29 terminated in an axle 31 upon which the wheel 27 is rotatably mounted. A beam or tube 33 extends upwardly from the drawbar 15 and is secured thereto by a suitable technique known in the art such as a weld. An angle support beam 35 is secured at one end to the drawbar 15 and at the other end to a position proximate the top of the beam 33 for securing and bracing in the arm 33 against forces generated by the external wing drawbar 19. Secured to the top of the beam 33 are a pair of plates 37 and 39 which are physically secured to the arm 33 by a weld. However, it should be appreciated that other techniques in the art for securely fixing the plates 37 and 39 to the arm 33 may be utilized. The plates 37 and 39 each have an aperture 41 therethrough for receiving a pivot pin 43. The pivot pin 43 is secured with respect to the plates 37 and 39 by means of a bolt 45 and locknut 90 as will be described more fully below. The plates 37 and 39 also have a pair of apertures 47 and 49 through which pins 51 are positioned to limit the rotation of the external wing drawbar 19 in the road transport position.

The external wing drawbar 19 has an upwardly extending beam 53 fixedly secured thereto by means known in the art. The upward extending beam 53 is braced to prevent rotation thereof in a vertical plane through the drawbar by beam member 55. The beams 53 and 33 extend upwardly for a distance sufficient to provide clearance for the wheel mounted on the axle 31. A horizontally aligned support beam 57 is secured to the beams 53 and 55 and extends toward the internal drawbar 15. A set of plates 59 is secured to each side of the horizontally aligned beam 57 and support a cylindrical bearing member 61.

In operation, the cylindrical bearing member 61 is aligned with the apertures 41 of the plates 37 and 39 such that the pin 43 can be inserted therethrough for joining and connecting the drawbar 19 to the drawbar 15. With such an arrangement the drawbar 19 can move vertically with respect to the drawbar 15 as the drawbar assembly with attached farm implement is drawn over a field.

In the preferred embodiment, the beams 15 and 19 which form the internal and external wing drawbars, respectively, are 4×6 inch rectangular steel tubing. The beams 33 and 53 are also 4×6 inch rectangular steel tubing while the locking pin 43 is 1¾ inches in diameter.

Refer now to FIGS. 3 and 4 which are detailed illustrations of the connector portion of the external wing drawbar 19. The horizontal beam 57 is shown secured to the vertical beam 53 and the brace beam 55. As aforementioned, beams 53 and 55 are preferably 4×6 inch rectangular steel tubing. Horizontal beam 57 is preferably 4×4 inch square steel tubing.

A pair of plates 59 are secured to each side of the horizontal beam 57 and each have an aperture 63 therethrough for receiving the cylindrical bearing 61. The aperture 63 in each of the plates 59 is preferably about 3 inches in diameter to permit insertion therein of a bearing cylinder having an external diameter of about 2⅞ inches and an internal diameter of 1¾ inches. A pair of plates 64 are secured to each of the plates 59 for added support and to limit rotation of the external wing drawbar in the horizontal plane. The bearing 61 is secured to the plates by a weld. The cylindrical bearing extends outwardly past each plate 59 by about ⅛ inch. A hole 62 is drilled through the bearing in order to permit a lubricant to be injected into the internal surface area of the bearing between the bearing and the pin 43.

Turn now to FIGS. 5 and 6 which illustrate the connector portion of the internal wing drawbar 15. A pair of plates 37 and 39 are shown secured to the vertical support beam 33 and to the cross support beam 35. To provide lateral strength, an additional beam 71 is welded to the vertical support beam 33. A pair of apertures 73, each 3 inches in diameter, are formed in the plates 37 and 39. Positioned in the aperture 73 of plate 39 is a bearing member 75 having an inside diameter of 1¾ inches. This bearing has a hole therethrough which is aligned with a hole in the pin 43 for receiving a bolt for locking the pin 43 in place. The other bearing 77 is positioned in the aperture of plate 37 and has an inside diameter of 1¾ inches. Each of these bearings provides supporting strength to prevent gawling of the plates 37 and 39 by the pin 43.

At the external end of each of the plates 37 and 39 are a pair of upper and lower holes 79 and 81, respectively. These holes receive a set of locking pins (pins 51 of FIG. 2) which limit the rotation of the external wing drawbar 19 when the drawbar assembly is being transported. When positioned in the field, the pins are inserted into storage rings generally designated by the numeral 83. The plates 37 and 39 are reinforced against bending forces by means of a pair of top and bottom plates 85 and 87, respectively. In the preferred embodiment, the plates 37 and 39 are 1 inch thick and are about 20 inches long. The pins which are inserted through the apertures 79 and 81 are preferably 1 inch in diameter and are formed of a high-strength steel.

While the preferred embodiment of the present invention has been disclosed herein, it should be appreciated that there may be other alternative embodiments of the invention which fall within the spirit and scope thereof as defined by the appended claims.

What is claimed is:

1. A hinge-wing drawbar device comprising:
   a first internal drawbar adapted to have secured thereto an implement to be drawn by said drawbar;
   a second external wing drawbar substantially aligned with said internal drawbar and adapted to have secured thereto an implement to be drawn by said external drawbar;
   a first support wheel rotatably mounted on said internal drawbar between said internal and said external drawbar and a second support wheel rotatably mounted on said external drawbar, said first support wheel having its axis of rotation aligned with the axis of rotation of said second support wheel and in parallel with the longitudinal axis of said internal and said external wing drawbars; and
   means for flexibly connecting said external wing drawbar to said internal drawbar including a first support member fixedly secured to said first internal drawbar and extending upwardly therefrom above said support wheel, said support member having a pin receiving aperture, a second support member fixedly connected to said external wing drawbar and extending upwardly therefrom from a first height insufficient to provide clearance for said first support wheel to a second height sufficient to provide clearance for said first support wheel, said second support member having a portion at said second height extending substantially horizontally toward said first support member and over said first support wheel and having a pin receiving bearing aligned with said aperture, a pin being positioned in said aperture and through said bearing for connecting said external wing drawbar to said internal drawbar, said external wing drawbar being rotatable in a vertical plane with respect to said internal drawbar.

2. The hinge-wind drawbar device of claim 1 wherein said first support member of said flexible connecting means further comprises:
   a vertical support beam fixedly secured to said internal drawbar;
   a pair of plates fixedly secured to said vertical support beam and extending substantially horizontally from said vertical support beam toward said external wing drawbar;
   said pair of plates each having said pin receiving aperture therethrough, the axis of said apertures being aligned with one another and in the direction of forward movement of said drawbar when in use;
   said pair of plates having stop means for limiting rotation of said external drawbar when being transported; and
wherein said second support member of said flexible connecting means comprising:
   a second vertical support beam connected to said external wing drawbar; and
   a horizontally aligned support beam connected to said second support beam forming said horizontally extending portion.

3. The hinge-wing drawbar device of claim 2 wherein said vertical support beams and said horizontally aligned support beam each have a cross section at least as large as the cross section of said internal and said external wing drawbars.

4. The hinge-wing drawbar device of claim 3 further comprising means for lubricating the interface between said bearing, said apertures and said pin.

5. The hinge-wing drawbar device of claim 4 wherein said pin is at least about 1¾ inches in diameter.

6. The hinge-wing drawbar device of claim 5 wherein said vertical support beams each include brace beam means for supporting said beams from rotation in a vertical plane through said drawbars.

7. The hinge-wing drawbar device of claim 6 wherein said pair of plates are at least 1 inch thick and wherein said apertures each have a bearing surface.

* * * * *